US012740919B2

(12) United States Patent
Wang

(10) Patent No.: US 12,740,919 B2
(45) Date of Patent: Sep. 22, 2026

(54) CONTINUOUS NEEDLE EJECTION DEVICE

(71) Applicant: Junhao Wang, Hangzhou (CN)

(72) Inventor: Junhao Wang, Hangzhou (CN)

( * ) Notice: Subject to any disclaimer, the term of this patent is extended or adjusted under 35 U.S.C. 154(b) by 0 days.

(21) Appl. No.: 19/313,057

(22) Filed: Aug. 28, 2025

(65) Prior Publication Data

US 2025/0375352 A1 Dec. 11, 2025

Related U.S. Application Data

(63) Continuation of application No. PCT/CN2024/097915, filed on Jun. 7, 2024.

(30) Foreign Application Priority Data

Jul. 21, 2023 (CN) ......................... 202310899693.1

(51) Int. Cl.
*A61H 39/08* (2006.01)

(52) U.S. Cl.
CPC ... *A61H 39/086* (2013.01); *A61H 2201/0192* (2013.01)

(58) Field of Classification Search
None
See application file for complete search history.

(56) References Cited

U.S. PATENT DOCUMENTS 5,129,914 A * 7/1992 Choi .................. A61B 50/3001 606/189
2005/0067309 A1* 3/2005 Choi ...................... B65D 83/02 606/189
2005/0067310 A1* 3/2005 Choi ...................... B65D 83/02 206/366
2005/0115980 A1* 6/2005 Grandy .................. A61H 39/08 221/66

(Continued)

FOREIGN PATENT DOCUMENTS

CN 101137342 A 3/2008
CN 103126883 A 6/2013

(Continued)

OTHER PUBLICATIONS

CN 103126883 English Language translation (original document cited in IDS filed by Applicant) Published: Jun. 5, 2013; Inventor: Tu (Year: 2013).*

*Primary Examiner* — Shaun L David

(57) ABSTRACT

A continuous needle ejection device, comprising a pressing portion and a needle cartridge portion; the pressing portion comprises a striking needle and a housing assembly, and the striking needle is fixed to the housing assembly; a tail end of the needle cartridge portion is located inside the housing assembly, and the needle cartridge portion contains a needle assembly formed by a plurality of single needles arranged sequentially; a needle advancing portion possessing elastic potential energy is installed inside the needle cartridge portion, and the elastic potential energy of the needle (Continued)

advancing portion acts on the needle assembly, thereby driving the foremost single needle of the needle assembly to be constantly pushed into alignment with the striking needle. Operating the pressing portion to move axially relative to the needle cartridge portion drives the striking needle to abut the aligned single needle and push it out.

9 Claims, 8 Drawing Sheets

(56) References Cited

U.S. PATENT DOCUMENTS

| | | | | |
|---|---|---|---|---|
| 2008/0097505 | A1* | 4/2008 | Kim | A61H 39/08 606/189 |
| 2010/0191269 | A1 | 7/2010 | Kim | |

FOREIGN PATENT DOCUMENTS

| | | | |
|---|---|---|---|
| CN | 212817183 | U | 3/2021 |
| CN | 113397967 | A | 9/2021 |
| CN | 114948714 | A | 8/2022 |
| CN | 116650322 | A | 8/2023 |
| CN | 220833615 | U | 4/2024 |
| WO | 2004009010 | A2 | 1/2004 |

* cited by examiner

CONTINUOUS NEEDLE EJECTION DEVICE

TECHNICAL FIELD

The invention relates to a medical instrument, specifically a continuous needle ejection device for acupuncture treatment.

BACKGROUND ART

Acupuncture can effectively help patients alleviate diseases and relieve pain, offering unique and significant therapeutic effects for many conditions. As an essential component of traditional Chinese medicine, acupuncture treatment increasingly tests the practitioner's skill, particularly in needle insertion, which demands high stability and precision. Typically, multiple points on the human body require needling to achieve coordinated treatment.

Currently, repetitive manual steps-such as retrieving, aligning, and inserting needles-demand significant attention from the practitioner, consuming considerable energy and physical strength. Therefore, optimizing or improving acupuncture procedures to reduce practitioner fatigue is an ongoing research focus.

SUMMARY OF THE INVENTION

To address issues in the prior art, the invention provides a novel technical solution: a continuous needle ejection device that streamlines repetitive needle-retrieval steps, reduces user effort, and enhances acupuncture efficiency.

Specifically, the technical solution of the invention is as follows:

a continuous needle ejection device, comprising a pressing portion and a needle cartridge portion;

the pressing portion comprises a striking needle and a housing assembly, and the striking needle is fixed to the housing assembly;

a tail end of the needle cartridge portion is located inside the housing assembly, and the needle cartridge portion contains a needle assembly formed by a plurality of single needles arranged sequentially;

a needle advancing portion possessing elastic potential energy is installed inside the needle cartridge portion, and the elastic potential energy of the needle advancing portion acts on the needle assembly, thereby driving the foremost single needle of the needle assembly to be constantly pushed into alignment with the striking needle; operating the pressing portion to move axially relative to the needle cartridge portion drives the striking needle to abut the aligned single needle and push it out.

Preferably, the needle advancing portion comprises a needle-pushing wheel stand and a steel coil, and the needle cartridge portion comprises a needle ejection cartridge;

the needle-pushing wheel stand is docked with a tail end of the needle ejection cartridge and is coaxial with the needle ejection cartridge; the needle-pushing wheel stand is provided with a needle-pushing boss extending outward;

the tail end of the needle ejection cartridge is provided with a C-shaped countersunk blind groove, and one end of the countersunk blind groove forms a needle ejection hole penetrating through the needle ejection cartridge;

the needles are sequentially arranged inside the countersunk blind groove;

the steel coil is clamped between the needle-pushing wheel stand and the needle ejection cartridge, and the steel coil has a coiled structure possessing elastic potential energy; the needle-pushing boss constantly abuts the rearmost single needle of the needle assembly, thereby driving the foremost single needle of the needle assembly to constantly be positioned directly above the needle ejection hole.

Preferably, the tail end of the needle ejection cartridge is further provide with a limiting boss extending towards the needle-pushing wheel stand, which is configured to restrict the needle-pushing boss from rotating a full circle.

Preferably, the needle-pushing wheel stand has an outwardly convex three-step ladder structure and is provided with a first bayonet in its third step; the needle ejection cartridge has a corresponding inwardly concave ladder structure and is provided with a second bayonet; the steel coil is sleeved onto the third step; an innermost end of the steel coil is fixed to the first bayonet, and an outermost end is fixed to the second bayonet.

Preferably, the needle cartridge portion further comprises a needle cartridge cover, and the needle cartridge cover is provide with a C-shaped slot corresponding to the countersunk blind groove; the needle cartridge cover abuts the needle-pushing wheel stand and is fixed to the needle ejection cartridge; a tail portion of the needle assembly is located inside the slot.

Preferably, the needle cartridge cover is further provided with a four-claw flange, and the needle ejection cartridge is internally provided with a corresponding clamping position; the four-claw flange passes through the needle-pushing wheel stand and is clamped with the clamping position, thereby preventing relative rotation between the needle cartridge cover and the needle ejection cartridge;

the needle cartridge cover is provided with four bolt positions, and the needle ejection cartridge is also provided with four bolt holes; the needle cartridge cover, the needle-pushing wheel stand, the steel coil, and the needle ejection cartridge forms the needle cartridge portion by fastening bolts.

Preferably, the slot is a countersunk structure, and a countersunk portion of the slot is covered with a C-shaped cover plate.

Preferably, the housing assembly comprises a tail cap, a housing body, a limiting platform, a spring, a limiting cover, a guide rod, and a fine adjustment column;

the striking needle is fixed to the tail cap, and the housing body is fixed to the tail cap by screws;

the fine adjustment column is threaded to the tail cap;

the guide rod comprises a head portion and a rod portion, and the rod portion of the guide rod passes through the limiting platform and the spring and is threaded to the fine adjustment column; the spring is sleeved onto the guide rod, and the head portion of the guide rod is restricted from passing through the limiting platform; the tail cap, the housing body, the limiting platform, the spring, the guide rod, and the fine adjustment column together constitute the pressing portion;

an inner diameter of a tail portion of the limiting cover is smaller than an outer diameter of the needle cartridge cover; the limiting cover is introduced from the needle ejection cartridge and threaded to the housing body; when the tail portion of the limiting cover abuts the needle cartridge cover, the needle cartridge portion and the pressing portion are connected.

Preferably, an inner side wall of the housing body is further provided with a guide rail extending axially along the housing body;

an outer wall of the limiting platform is provided with a first guide groove, and an outer wall of the needle cartridge cover is provided with a second guide groove; the guide rail is assembled inside the first guide groove and the second guide groove.

Preferably, the fine adjustment column is marked with graduations along its axial direction.

The advantageous effects of the invention are:

By ingeniously designing the structure of the needle ejection device, the pressing portion and needle cartridge portion cooperate to enable continuous needle ejection. The practitioner pre-loads needles into the needle cartridge portion. During treatment, operating the pressing portion ejects a needle with each press, eliminating the tedium of repetitive needle retrieval and significantly enhancing the convenience of acupuncture procedures.

BRIEF DESCRIPTION OF ACCOMPANY DRAWINGS

In the FIGURES: 100 refers to the needle assembly; 101 refers to the needle tip; 102 refers to the needle handle; 200 refers to the pressing portion; 201 refers to the striking needle; 202 refers to the tail cap; 203 refers to the housing body; 2031 refers to the guide rail; 204 refers to the limiting platform; 2041 refers to the first guide groove; 205 refers to the spring; 206 refers to the limiting cover; 207 refers to the guide rod; 208 refers to the fine adjustment column; 300 refers to the needle cartridge portion; 310 refers to the needle ejection cartridge; 311 refers to the countersunk blind groove; 312 refers to the limiting boss; 313 refers to the second bayonet; 314 refers to the clamping position; 315 refers to the needle ejection hole; 316 refers to the bolt hole; 320 refers to the needle cartridge cover; 3201 refers to the second guide groove; 321 refers to the slot; 322 refers to the cover plate; 323 refers to the four-claw flange; 324 refers to the bolt position; 325 refers to the bolt; 326 refers to the avoidance position; 400 refers to the needle advancing portion; 410 refers to the needle-pushing wheel stand; 411 refers to the needle-pushing boss; 412 refers to the first bayonet; 420 refers to the steel coil.

SPECIFIC EMBODIMENT OF THE INVENTION

The principles and features of the invention will be described hereinafter. Embodiments are provided for illustration only and do not limit the scope of the invention.

The embodiment provides a continuous needle ejection device to assist practitioners in performing acupuncture treatment by enabling continuous needle output.

Figure 1:
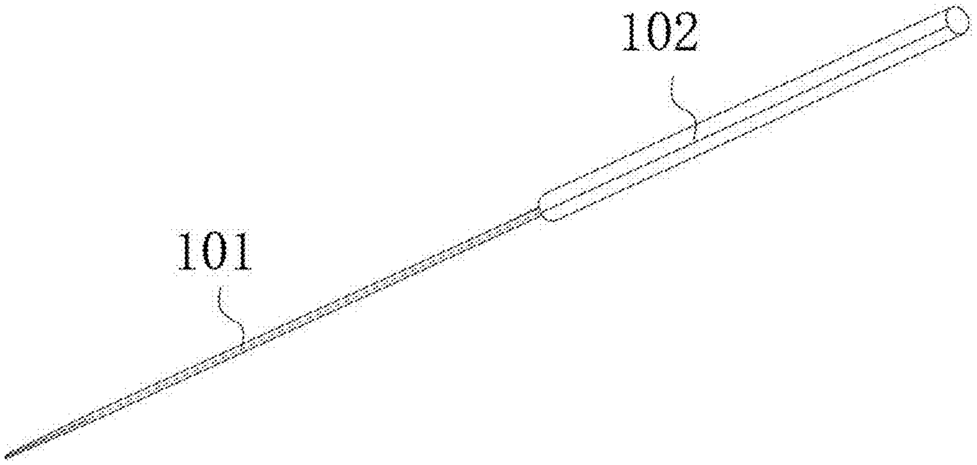
FIG. 1 is a schematic view of the needle structure according to the invention.

Before detailing the solution, the needle structure is briefly explained. As shown in FIG. 1, a needle comprises a needle tip 101 and a needle handle 102, and the needle handle 102 has a larger diameter than the needle tip 101. During insertion, the practitioner typically holds the needle handle 102 and inserts the needle tip 101 into the patient's skin using a twisting technique.

The continuous needle ejection device is designed based on this needle structure. Multiple needles are pre-loaded into the device, allowing the practitioner to easily eject needles into the patient's skin during treatment.

To facilitate understanding, the structure of the continuous needle ejection device is described in detail hereinafter.

Figure 2:
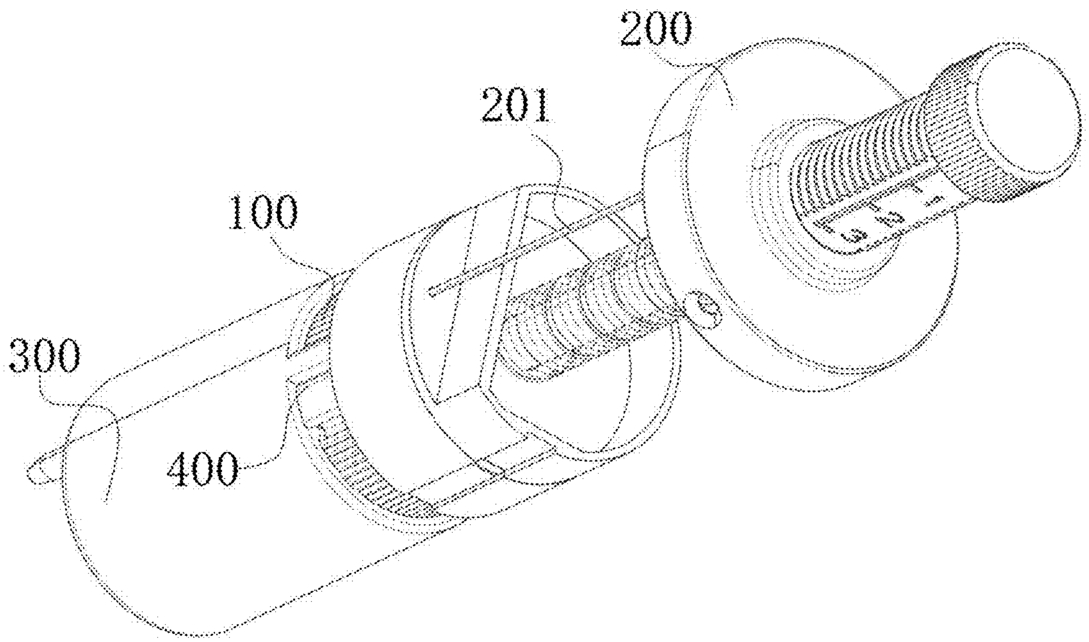
FIG. 2 is a simplified assembly view of the pressing portion and needle cartridge portion according to the invention.
Figure 3:
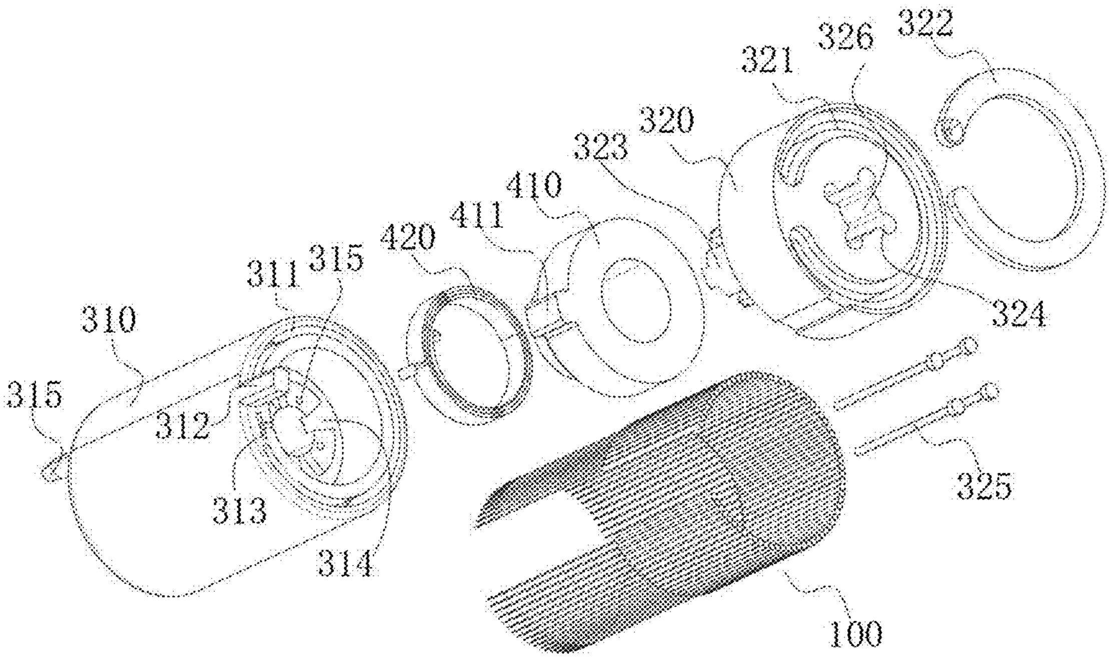
FIG. 3 is an exploded view of all components of the needle cartridge portion according to the invention.
Figure 4:
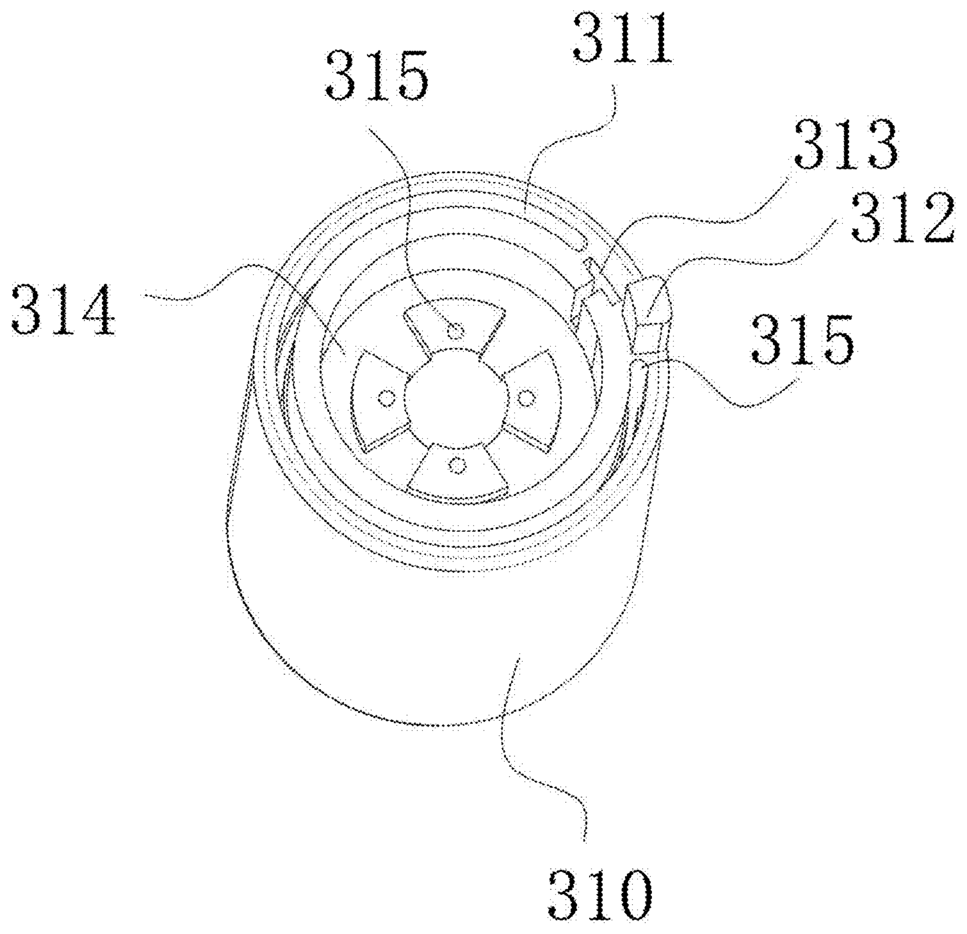
FIG. 4 is a perspective view of the needle ejection cartridge according to the invention.
Figure 5:
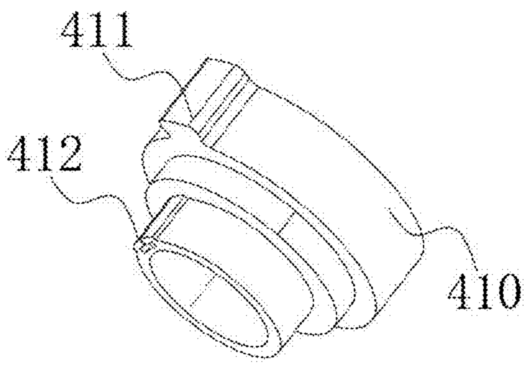
FIG. 5 is a perspective view of the needle-pushing wheel stand according to the invention.
Figure 6:
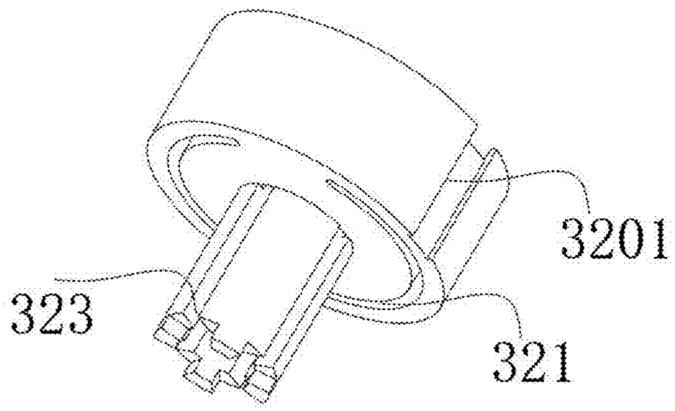
FIG. 6 is a first perspective view of the needle cartridge cover according to the invention.
Figure 7:
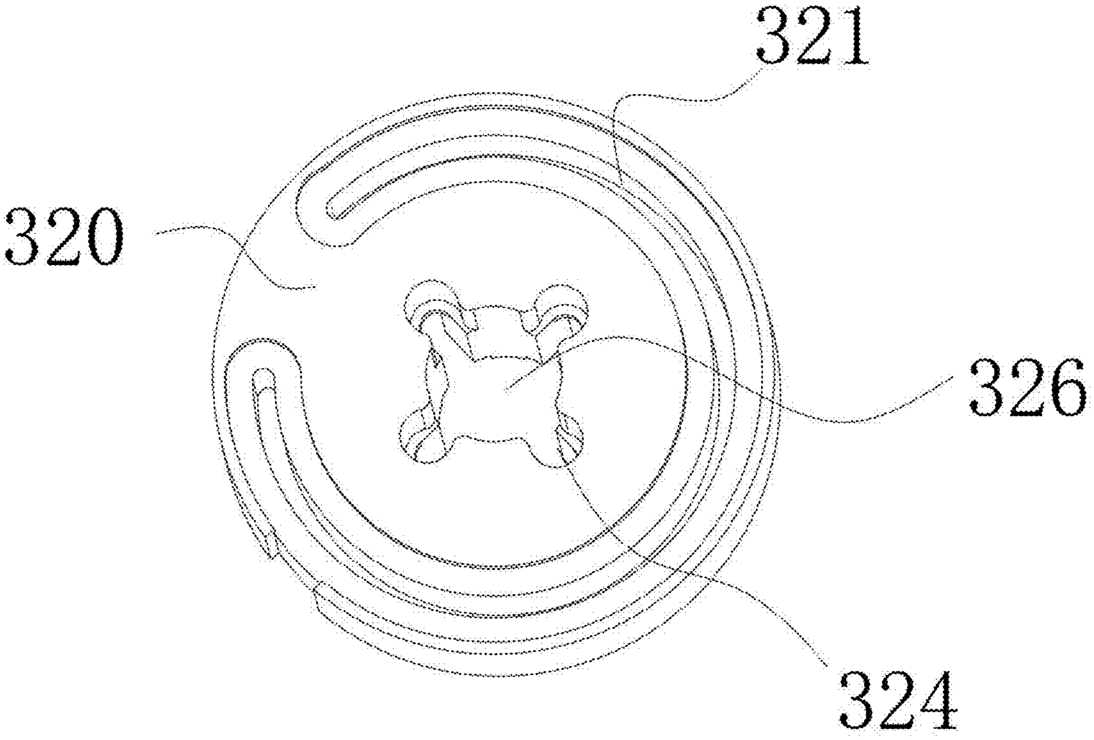
FIG. 7 is a second perspective view of the needle cartridge cover according to the invention.
Figure 8:
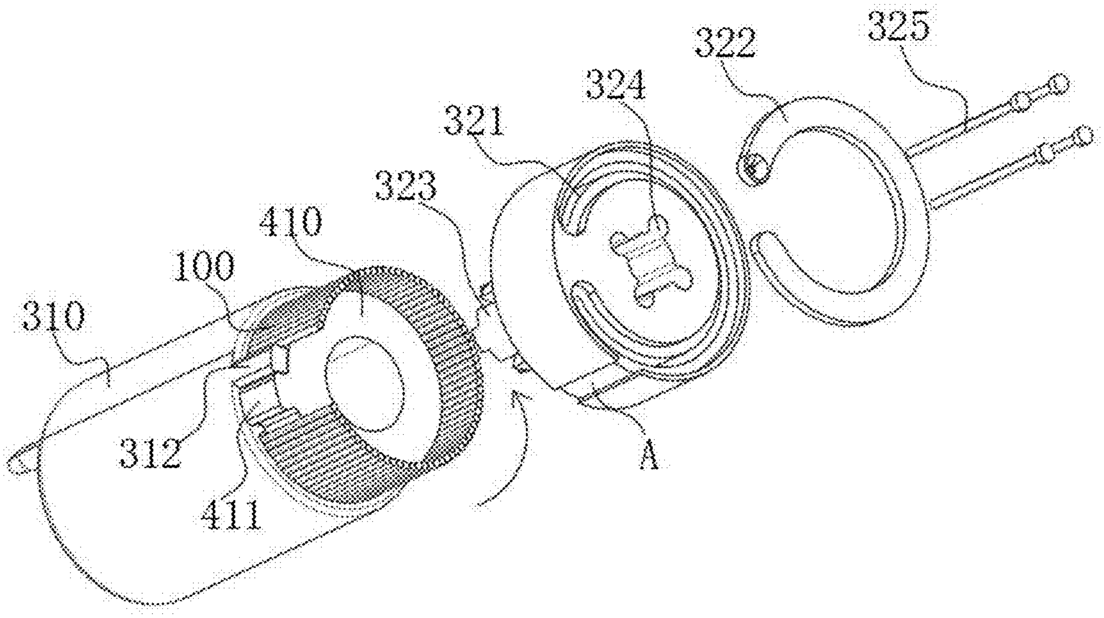
FIG. 8 is a partial exploded view of the needle cartridge portion during installation of the needle-pushing wheel stand and steel coil into the needle ejection cartridge according to the invention.
Figure 9:
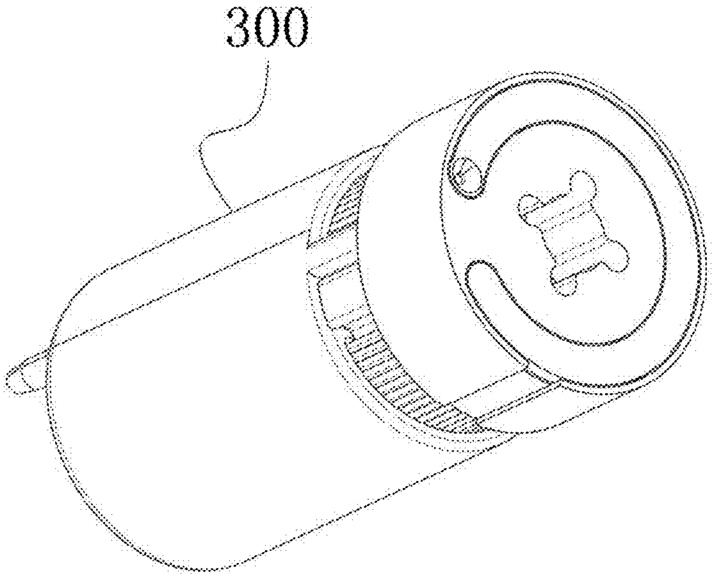
FIG. 9 is a complete structural view of the needle cartridge portion according to the invention.

In the embodiment, as shown in FIG. 2, a continuous needle ejection device, comprising a pressing portion 200 and a needle cartridge portion 300; multiple single needles are placed in the needle cartridge portion 300. Operating the pressing portion 200 enables continuous ejection of single needles.

Specifically, the pressing portion 200 comprises a striking needle 201 and a housing assembly, and the striking needle 201 is fixed to the housing assembly, specifically to an edge of the housing assembly. The housing assembly and striking needle 201 share parallel central axes.

A tail end of the needle cartridge portion 300 is located inside the housing assembly; this means part of the needle cartridge portion 300 is installed inside the pressing portion 200, and another part is outside. The needles are neatly arranged inside the part of the needle cartridge portion 300 connected to the pressing portion 200. For ease of description, the structure formed by multiple single needles arranged sequentially is defined as a needle assembly 100, and the needle assembly 100 is specifically accommodated inside the needle cartridge portion 300.

Simultaneously, a needle advancing portion 400 possessing elastic potential energy is installed inside the needle cartridge portion 300; the function of the needle advancing portion 400 is to push the needles in the needle assembly 100 to feed them one by one. Specifically, the elastic potential energy of the needle advancing portion 400 acts on the needle assembly 100, thereby driving the foremost single needle of the needle assembly 100 to be constantly pushed into alignment with the striking needle 201; operating the pressing portion 200 to move axially relative to the needle cartridge portion 300 drives the striking needle 201 to abut the aligned single needle and push it out, thereby inserting into the patient's body.

In this solution, the needle advancing portion 400 is specifically installed inside the needle cartridge portion 300 and cooperates with it to enable the single needles in the needle assembly 100 to feed continuously. Finally, under the impact of the striking needle 201, the foremost single needle in the needle assembly 100 is ejected. Therefore, the following introduction will first explain the structure of the needle advancing portion 400 and the needle cartridge portion 300 to understand their operating principle, and then separately introduce the pressing portion 200.

Specifically, as shown in FIGS. 3-9, the needle advancing portion 400 comprises a needle-pushing wheel stand 410 and a steel coil 420, and the needle cartridge portion 300 comprises a needle ejection cartridge 310. In the assembled structure, the needle-pushing wheel stand 410 is docked with a tail end of the needle ejection cartridge 310 and is coaxial with the needle ejection cartridge 310; the needle-pushing wheel stand 410 is provided with a needle-pushing boss 411 extending outward; the tail end of the needle ejection cartridge 310 is provided with a C-shaped countersunk blind groove 311, and one end of the countersunk blind groove forms a needle ejection hole 315 penetrating through the needle ejection cartridge 310, with the needle ejection hole 315 connected to the countersunk blind groove 311; the needles are sequentially arranged inside the countersunk blind groove 311.

The needle assembly 100 is arranged in a suspended manner inside the countersunk blind groove 311. Since each needle structure comprises a needle tip 101 and a needle handle 102, and the diameter of the needle handle 102 is larger than the needle tip 101, the countersunk structure of the blind groove 311 is primarily used to restrict the needle handle 102. That is, the gap of the blind groove 311 allows the needle tip 101 to pass through, but the countersunk structure restricts the needle handle 102. Therefore, needles placed in the countersunk blind groove 311 hang suspended. This design ensures the bottom of the entire needle assembly 100 does not contact the needle ejection cartridge, preventing friction. Under the action of the needle-pushing wheel stand 410, the needles can move smoothly. The diameter of the needle ejection hole 315 is larger than the needle handle 102, allowing smooth ejection.

The function of the steel coil 420 is to provide elastic pushing force to the needle-pushing wheel stand 410. Specifically, the steel coil 420 is clamped between the needle-pushing wheel stand 410 and the needle ejection cartridge 310, and the steel coil 420 has a coiled structure possessing elastic potential energy. The pre-coiled steel coil 420 is installed between the needle-pushing wheel stand 410 and the needle ejection cartridge 310, with its two ends fixed to them respectively. Under the recoil force of the steel coil 420, the needle-pushing wheel stand 410 rotates axially relative to the needle ejection cartridge 310 (the rotation direction of the needle-pushing wheel stand 410 is counterclockwise shown in FIG. 5). The needle-pushing boss 411 on the needle-pushing wheel stand 410 constantly abuts the rearmost single needle in the needle assembly 100. Therefore, whenever the needle-pushing wheel stand 410 rotates, the needle-pushing boss 411 pushes the needle assembly 100, ensuring the foremost single needle is constantly positioned directly above the needle ejection hole, ready for the next action of the striking needle 201 in the pressing portion 200. Simultaneously, the pressure from the needle-pushing boss 411 prevents needles from falling out of the needle ejection hole 315.

In this solution, the needle assembly 100 rests inside the C-shaped countersunk blind groove 311. When the groove is fully loaded, the needle assembly 100 also forms a C-shape. As needles are ejected one by one, the needle-pushing boss 411 will complete one full rotation. To ensure the steel coil 420 maintains efficient recoil potential energy, a limiting boss 312 extending towards the needle-pushing wheel stand 410 is provided at the tail end of the needle ejection cartridge 310. This limiting boss 312 corresponds to the needle-pushing boss 411 and primarily restricts it from rotating more than one full circle. The position of the limiting boss 312 corresponds to the positions of the C-shaped countersunk blind groove 311 and the needle ejection hole 315, allowing all needles in the assembly to be pushed by the needle-pushing boss 411.

That is, the needle-pushing boss 411 pushes the needle assembly 100 until all needles are ejected. At this point, the needle-pushing boss 411 is blocked by the limiting boss 312 and cannot rotate further. Only after manually rotating the needle-pushing boss 411 back to its original position can new needles be reloaded into the countersunk blind groove 311.

The above structure effectively ensures the elasticity of the steel coil 420, preventing a reduction in stored elastic potential energy due to continuous rotation of the needle-pushing boss 411, which would affect needle feeding.

Optionally, the needle-pushing wheel stand 410 has an outwardly convex three-step ladder structure and is provided with a first bayonet 412 in its third step; the needle ejection cartridge 310 has a corresponding inwardly concave ladder structure and is provided with a second bayonet 313; the steel coil 420 is sleeved onto the third step; an innermost end of the steel coil 420 is fixed to the first bayonet 412, and an outermost end is fixed to the second bayonet 313.

Designing the needle-pushing wheel stand 410 as a three-step structure primarily facilitates the installation and shaping of the steel coil 420, preventing it from loosening or deforming during use. The first bayonet and the second bayonet 313 allow better engagement between the steel coil 420 and the needle-pushing wheel stand 410 and the needle ejection cartridge 310. Compared to fixed methods, the clamping engagement offers greater flexibility and ease of replacing a fatigued steel coil 420.

In this solution, the needle cartridge portion 300 further comprises a needle cartridge cover 320, and the needle cartridge cover 320 is provide with a C-shaped slot 321 corresponding to the countersunk blind groove 311; during installation, the needle cartridge cover 320 abuts the needle-pushing wheel stand 410 and is fixed to the needle ejection cartridge 310; a tail portion of the needle assembly 100 is located inside the slot 321. The slot 321 is a countersunk structure, and its countersunk portion is covered with a C-shaped cover plate 322. When loading needles, they pass through the slot 321 into the countersunk blind groove 311. The cover plate 322 prevents needles from falling out.

Optionally, the fixation between the needle cartridge cover 320 and the needle ejection cartridge 310 includes alignment and locking; specifically, the needle cartridge cover 320 is further provided with a four-claw flange 323, and the needle ejection cartridge 310 is internally provided with a corresponding clamping position 314; the four-claw flange 323 passes through the needle-pushing wheel stand 410 and is clamped with the clamping position 314, thereby preventing relative rotation between the needle cartridge cover 320 and the needle ejection cartridge 310; the needle cartridge cover 320 is provided with four bolt positions 324, and the needle ejection cartridge 310 is also provided with four bolt holes 316; fastening bolts 325 pass through the bolt positions 324 and engage the bolt holes 316; the needle cartridge cover 320, the needle-pushing wheel stand 410, the steel coil 420, and the needle ejection cartridge 310 forms the needle cartridge portion 300 by fastening bolts 325.

Thus, it is clear that the needle cartridge cover 320 is fixed to the needle ejection cartridge 310. However, under the action of the steel coil 420, the needle-pushing wheel stand 410 can rotate between the needle cartridge cover 320 and the needle ejection cartridge 310. That is, the needle cartridge cover 320 and needle ejection cartridge 310 restrict the axial movement of the needle-pushing wheel stand 410 but allow it to rotate axially to push the needle assembly 100.

Once the foremost needle in the needle assembly 100 is positioned above the needle ejection hole 315, the user operates the pressing portion 200. The striking needle 201 in the pressing portion 200 moves axially and impacts this needle, driving it into the needle ejection hole 315 until it exits the needle ejection cartridge 310 and pierces the patient's skin.

To optimize the pressing portion 200, the housing assembly is specifically designed. Specifically, with reference to FIGS. 10-15, the housing assembly comprises a tail cap 202, a housing body 203, a limiting platform 204, a spring 205, a limiting cover 206, a guide rod 207, and a fine adjustment column 208.

The specific connection structure is: the striking needle 201 is fixed to the tail cap 202, and the housing body 203 is fixed to the tail cap 202 by screws; the fine adjustment column 208 is threaded to the tail cap 202; the guide rod 207 comprises a head portion and a rod portion, and the rod portion of the guide rod 207 passes through the limiting platform 204 and the spring 205 and is threaded to the fine adjustment column 208; the spring 205 is sleeved onto the guide rod 207, and the head portion of the guide rod 207 is restricted from passing through the limiting platform 204; the tail cap 202, the housing body 203, the limiting platform 204, the spring 205, the guide rod 207, and the fine adjustment column 208 together constitute the pressing portion 200; an inner diameter of a tail portion of the limiting cover 206 is smaller than an outer diameter of the needle cartridge cover 320; the limiting cover 206 is introduced from the needle ejection cartridge 310 and threaded to the housing body 203; when the tail portion of the limiting cover 206 abuts the needle cartridge cover 320, the needle cartridge portion 300 and the pressing portion 200 are connected.

It can be understood that the housing body 203 of the pressing portion 200 sleeves over the needle cartridge cover 320. The limiting cover 206 is threaded onto a front end of the housing body 203 and abuts the needle cartridge cover 320, ensuring stable connection between the pressing portion 200 and the needle cartridge unit 300.

The specific usage method is: point the needle ejection hole 315 of the device towards the acupuncture point on the patient. The user presses down on the pressing portion 200. At this time, the housing body 203 of the pressing portion 200 moves axially downward relative to the needle cartridge portion 300. The spring 205 inside the pressing portion 200 is compressed, storing elastic potential energy. Simultaneously, the striking needle 201 impacts the aligned needle. Pressing continues until the needle pierces the patient's skin. After insertion, the user releases the pressing portion 200. The spring 205 rebounds, causing the housing body 203 to move axially back relative to the needle cartridge portion 300 until the limiting cover 206 abuts the needle cartridge cover 320. During this reset recoil, once the striking needle 201 is separated from the needle ejection hole 315, the needle assembly 100 in the needle cartridge portion 300 is reloaded under the pushing action of the needle-pushing wheel stand 410, so that a needle is located directly above the needle ejection hole 315, ready for the next strike by the striking needle 201. This cycle repeats.

An avoidance position 326 is provided on the needle cartridge cover 320 to allow movement of the guide rod 207 during pressing.

Thus, when using this device for acupuncture, each operation of the pressing portion 200 inserts one needle into the patient's skin. Continuous pressing enables sequential needle insertion at different points, offering high efficiency and convenience.

Optionally, to ensure smooth axial movement of the housing body 203 relative to the needle cartridge portion 300, an inner side wall of the housing body 203 is further provided with a guide rail 2031 extending axially along the housing body 203; an outer wall of the limiting platform 204 is provided with a first guide groove 2041, and an outer wall of the needle cartridge cover 320 is provided with a second guide groove 3201; the guide rail 2031 is assembled inside the first guide groove 2041 and the second guide groove 3201. When the housing body 203 moves in the axial direction relative to the needle cartridge portion 300, it also moves relative to the limiting platform 204 and the needle cartridge cover 320. At this time, the guide rail 2031 moves along the first guide groove 2041 and the second guide groove 3201. Therefore, during assembly, the needle cartridge cover 320 and the limiting platform 204 need to be accurately aligned.

Considering different patients have varying insertion depth requirements, the fine adjustment column 208 is marked with graduations along its axial direction. Since the fine adjustment column 208 is threaded to the tail cap 202, rotating it can adjust the position of the guide rod 207, which ultimately adjusts the distance between the limiting platform 204 and the tail cap 202, changing the distance between the striking needle 201 and the aligned needle. Consequently, upon impact, the needle is inserted deeper or shallower. Adjusting the fine adjustment column 208 thus controls insertion depth, and the graduations allow precise adjustment by the user.

This completes the detailed structural description of the device. The assembly steps are summarized as follows.

Assembly can be divided into two main modules: the pressing portion 200 and the needle cartridge portion 300 can be assembled separately without affecting each other. Finally, under the action of the limiting cover 206, the pressing portion 200 and needle cartridge portion 300 are connected.

Assembly sequence for the needle cartridge portion 300 (Ref. FIGS. 3-9):

- step 1: sleeve the steel coil 420 onto the third stage of the needle-pushing wheel stand 410; fix the innermost end of the steel coil 420 to the first bayonet 412 and fix the outermost end to the second bayonet 313; install the steel coil 420 and the needle-pushing wheel stand 410 into the needle ejection cartridge 310;
- step 2: install the needle cartridge cover 320: pass the four-claw flange 323 through the needle-pushing wheel stand 410 and clamp it into the clamping position 314 inside the needle ejection cartridge 310; secure the fastening bolts 325 through the four bolt positions 324 into the four bolt holes 316 on the needle ejection cartridge 310, so that the needle cartridge cover 320 is fixed to the needle ejection cartridge 310;
- step 3: manually rotate the needle-pushing boss 411 to wind the steel coil 420, storing elastic energy;

step 4: pass the needle assembly 100 through the C-shaped slot 321 on the needle cartridge cover 320 and place it into the C-shaped countersunk blind groove 311. The needle handle 102 should be inside the slot 321; release the needle-pushing boss 411; under the elastic force of the steel coil 420, the needle-pushing boss 411 presses against the needle assembly 100, applying pressure towards the needle ejection hole 315;

step 5: cover with the cover plate 322.

Figure 10:
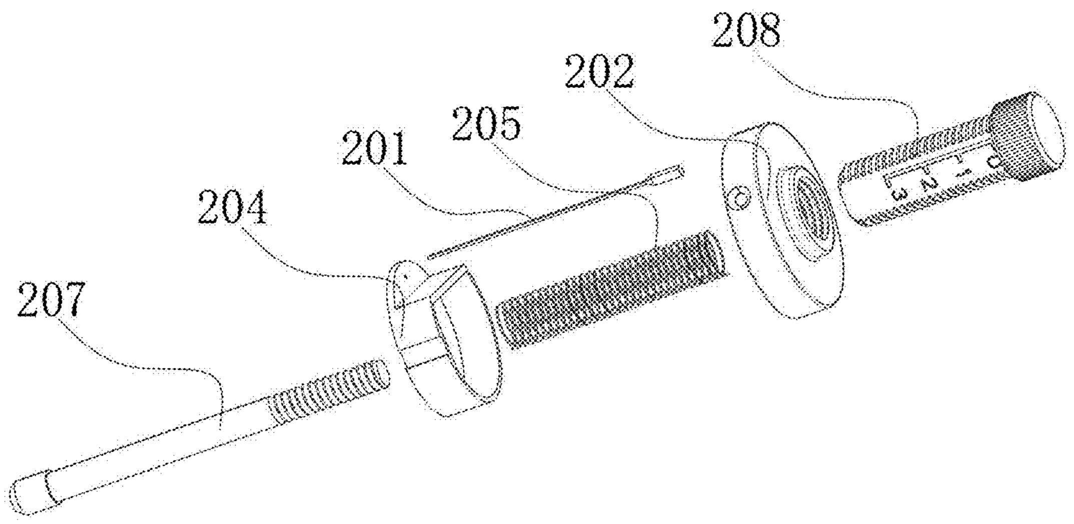
FIG. 10 is a first exploded view of all components of the pressing portion according to the invention.
Figure 11:
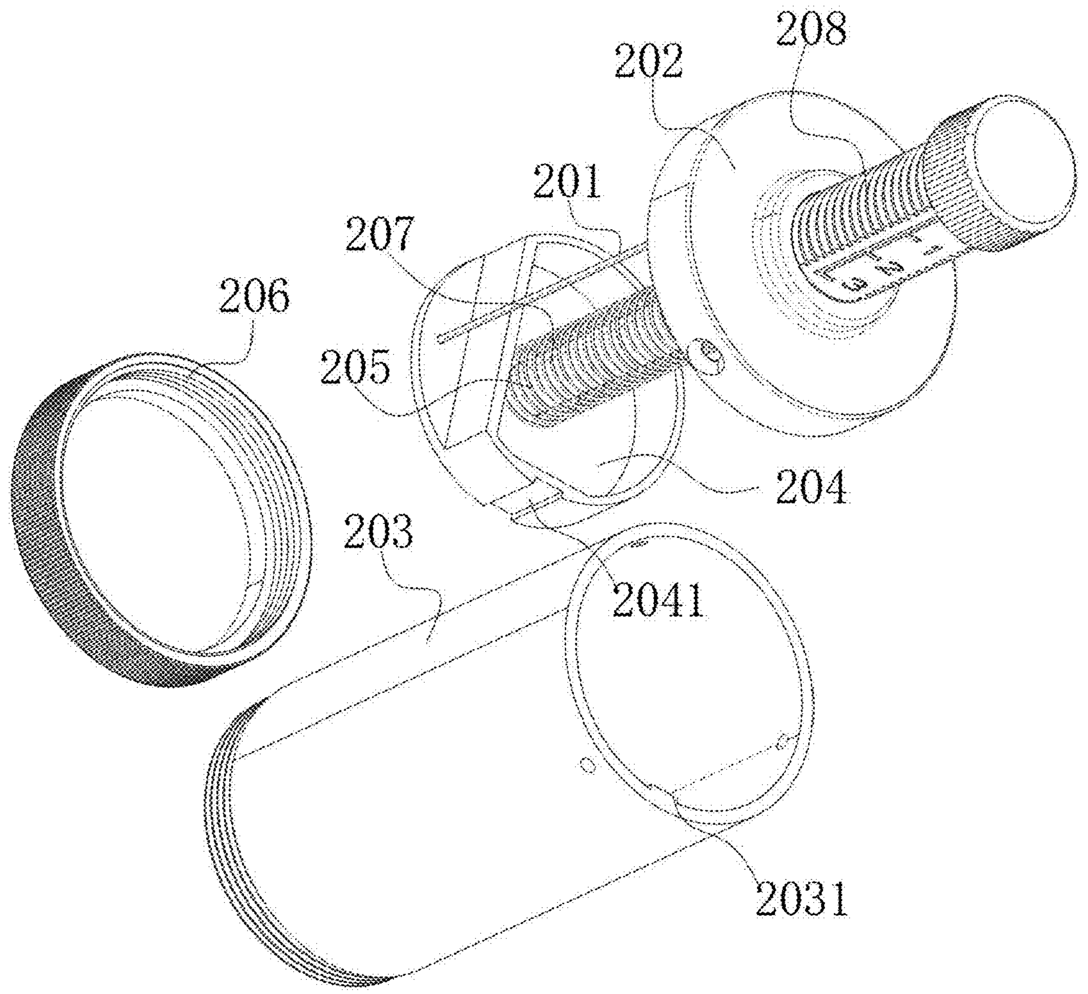
FIG. 11 is a second exploded view of all components of the pressing portion according to the invention.
Figure 12:
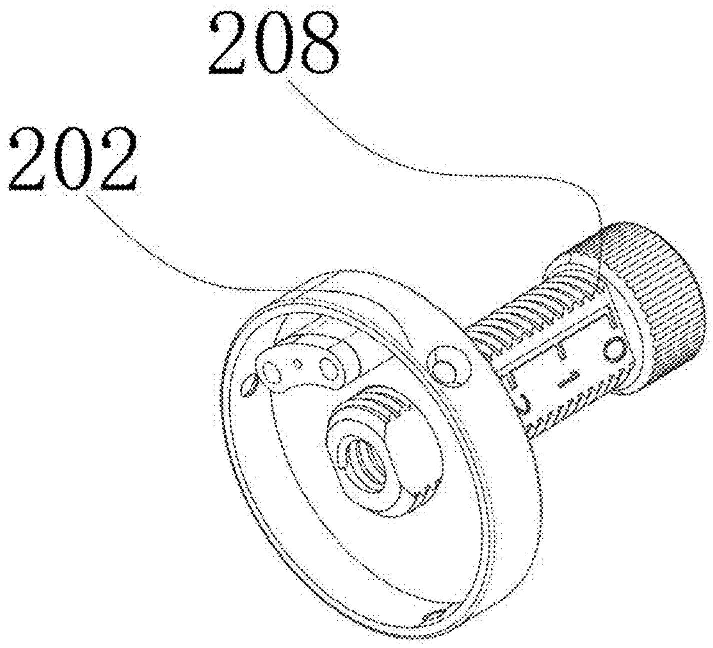
FIG. 12 is a schematic view of the fine adjustment column according to the invention.

Assembly sequence for the pressing portion 200 (Ref. FIGS. 10-11):

step 1: fix the striking needle 201 to the tail cap 202;

step 2: pass the rod portion of the guide rod 207 through the limiting platform 204 and the spring 205; thread it to the fine adjustment column 208 and thread the fine adjustment column 208 to the tail cap 202;

step 3: assemble the housing body 203: fix the housing body 203 to the tail cap 202 with screws; before fixing, ensure the guide rail 2031 on the inner wall of the housing body 203 aligns with the first guide groove 2041 on the limiting platform 204 and the second guide groove 3201 on the needle cartridge cover 320.

Figure 13:
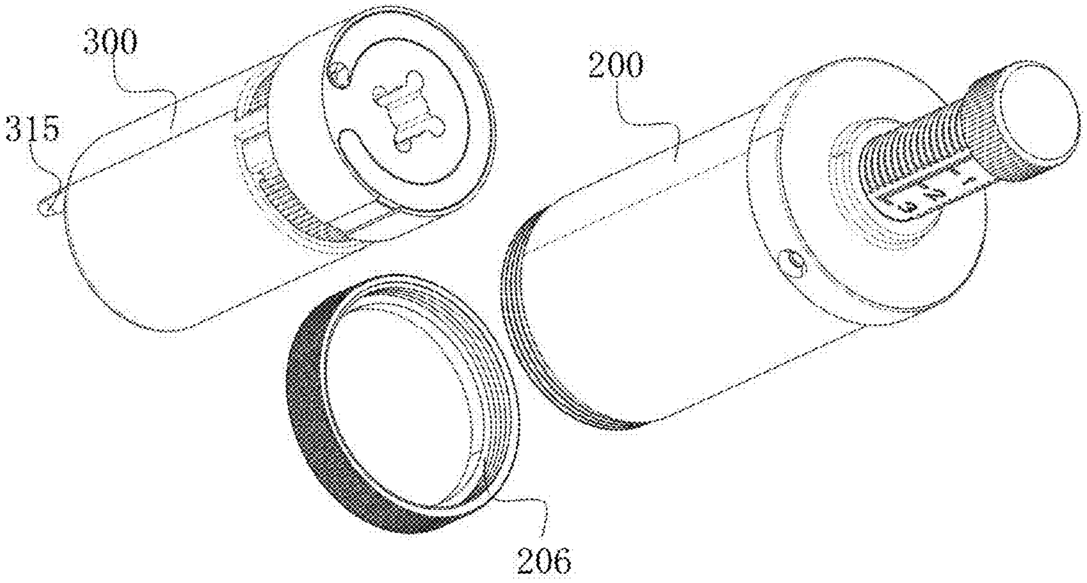
FIG. 13 is a disassembled view of the pressing portion, needle cartridge portion, and limiting cover according to the invention.
Figure 14:
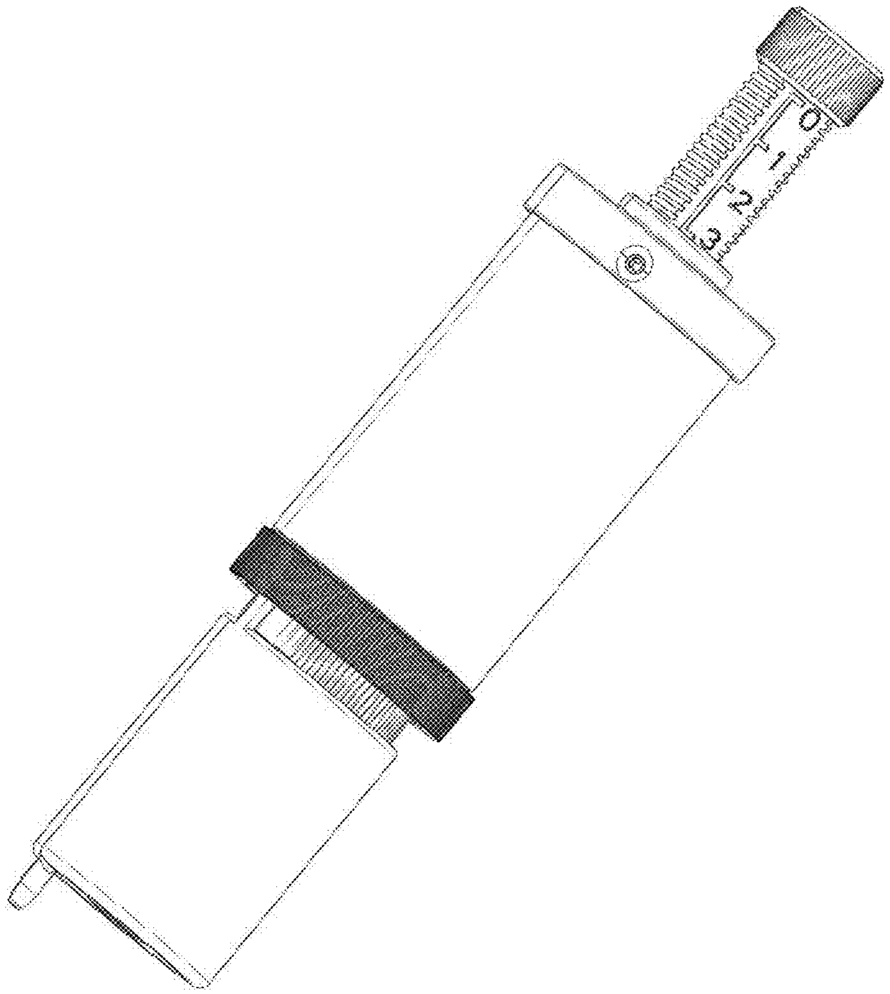
FIG. 14 is a perspective view of the continuous needle ejection device according to the invention.
Figure 15:
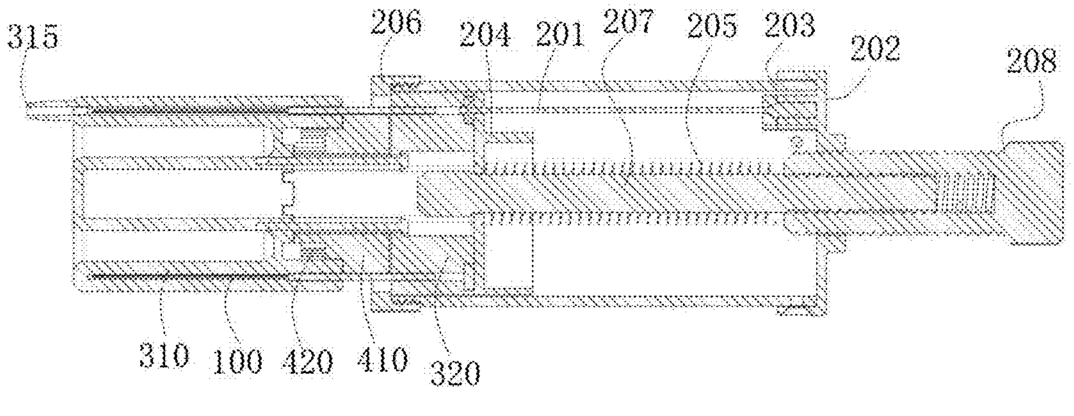
FIG. 15 is a cross-sectional view of the continuous needle ejection device according to the invention.

Referring to FIGS. 13-14, align and assemble the pressing portion and needle cartridge portion. Introduce the limiting cover 206 from the needle ejection cartridge 310 and thread it to the housing body 203. When the tail of the limiting cover 206 abuts the needle cartridge cover 320, the pressing portion 200 and needle cartridge portion 300 are fully assembled.

When needles are depleted and the needle cartridge needs to be replaced, unscrew the limiting cover 206, and once removed, the pressing portion 200 and needle cartridge portion 300 are separated; replace with a pre-loaded needle cartridge portion 300; alternatively, disassemble the used needle cartridge portion 300, open the cover plate 322 and manually rotate the needle-pushing boss 411 backwards to reset it, then reload needles.

By ingeniously designing the structure of the needle ejection device, the pressing portion and needle cartridge portion cooperate to enable continuous needle ejection. The practitioner pre-loads needles into the needle cartridge portion. During treatment, operating the pressing portion ejects a needle with each press, eliminating the tedium of repetitive needle retrieval and significantly enhancing the convenience of acupuncture procedures.

The above descriptions are merely preferred embodiments of the invention and are not intended to limit the invention. Any modifications, equivalent replacements, or improvements made within the spirit and principles of the invention should be included within the protection scope of the invention.

The invention claimed is:

1. A continuous needle ejection device, comprising a pressing portion and a needle cartridge portion;

the pressing portion comprises a striking needle and a housing assembly, and the striking needle is fixed to the housing assembly;

a tail end of the needle cartridge portion is located inside the housing assembly, and the needle cartridge portion contains a needle assembly formed by a plurality of single needles arranged sequentially;

a needle advancing portion possessing elastic potential energy is installed inside the needle cartridge portion, and the elastic potential energy of the needle advancing portion acts on the needle assembly, thereby driving the foremost single needle of the needle assembly to be constantly pushed into alignment with the striking needle; operating the pressing portion to move axially relative to the needle cartridge portion drives the striking needle to abut the aligned single needle and push it out;

the needle advancing portion comprises a needle-pushing wheel stand and a steel coil, and the needle cartridge portion comprises a needle ejection cartridge;

the needle-pushing wheel stand is docked with a tail end of the needle ejection cartridge and is coaxial with the needle ejection cartridge; the needle-pushing wheel stand is provided with a needle-pushing boss extending outward;

the tail end of the needle ejection cartridge is provided with a C-shaped countersunk blind groove, and one end of the countersunk blind groove forms a needle ejection hole penetrating through the needle ejection cartridge;

the needles are sequentially arranged inside the countersunk blind groove;

the steel coil is clamped between the needle-pushing wheel stand and the needle ejection cartridge, and the steel coil has a coiled structure possessing elastic potential energy; the needle-pushing boss constantly abuts the rearmost single needle of the needle assembly, thereby driving the foremost single needle of the needle assembly to constantly be positioned directly above the needle ejection hole.

2. The continuous needle ejection device of claim 1, wherein the tail end of the needle ejection cartridge is further provided with a limiting boss extending towards the needle-pushing wheel stand, which is configured to restrict the needle-pushing boss from rotating a full circle.

3. The continuous needle ejection device of claim 1, wherein the needle-pushing wheel stand has an outwardly convex three-step ladder structure and is provided with a first bayonet in its third step; the needle ejection cartridge has a corresponding inwardly concave ladder structure and is provided with a second bayonet; the steel coil is sleeved onto the third step; an innermost end of the steel coil is fixed to the first bayonet, and an outermost end is fixed to the second bayonet.

4. The continuous needle ejection device of claim 1, wherein the needle cartridge portion further comprises a needle cartridge cover, and the needle cartridge cover is provided with a C-shaped slot corresponding to the countersunk blind groove; the needle cartridge cover abuts the needle-pushing wheel stand and is fixed to the needle ejection cartridge; a tail portion of the needle assembly is located inside the slot.

5. The continuous needle ejection device of claim 4, wherein the needle cartridge cover is further provided with a four-claw flange, and the needle ejection cartridge is internally provided with a corresponding clamping position; the four-claw flange passes through the needle-pushing wheel stand and is clamped with the clamping position, thereby preventing relative rotation between the needle cartridge cover and the needle ejection cartridge;

the needle cartridge cover is provided with four bolt positions, and the needle ejection cartridge is also provided with four bolt holes; the needle cartridge cover, the needle-pushing wheel stand, the steel coil, and the needle ejection cartridge forms the needle cartridge portion by fastening bolts.

6. The continuous needle ejection device of claim 4, wherein the slot is a countersunk structure, and a countersunk portion of the slot is covered with a C-shaped cover plate.

7. The continuous needle ejection device of claim 4, wherein the housing assembly comprises a tail cap, a housing body, a limiting platform, a spring, a limiting cover, a guide rod, and a fine adjustment column;

the striking needle is fixed to the tail cap, and the housing body is fixed to the tail cap by screws;

the fine adjustment column is threaded to the tail cap;

the guide rod comprises a head portion and a rod portion, and the rod portion of the guide rod passes through the limiting platform and the spring and is threaded to the fine adjustment column; the spring is sleeved onto the guide rod, and the head portion of the guide rod is restricted from passing through the limiting platform; the tail cap, the housing body, the limiting platform, the spring, the guide rod, and the fine adjustment column together constitute the pressing portion;

an inner diameter of a tail portion of the limiting cover is smaller than an outer diameter of the needle cartridge cover; the limiting cover is introduced from the needle ejection cartridge and threaded to the housing body; when the tail portion of the limiting cover abuts the needle cartridge cover, the needle cartridge portion and the pressing portion are connected.

8. The continuous needle ejection device of claim 7, wherein an inner side wall of the housing body is further provided with a guide rail extending axially along the housing body;

an outer wall of the limiting platform is provided with a first guide groove, and an outer wall of the needle cartridge cover is provided with a second guide groove; the guide rail is assembled inside the first guide groove and the second guide groove.

9. The continuous needle ejection device of claim 7, wherein the fine adjustment column is marked with graduations along its axial direction.

* * * * *